Jan. 16, 1923.
D. N. HUMPHREY.
RAKE CLEANER.
FILED MAR. 7, 1922.
1,442,615.
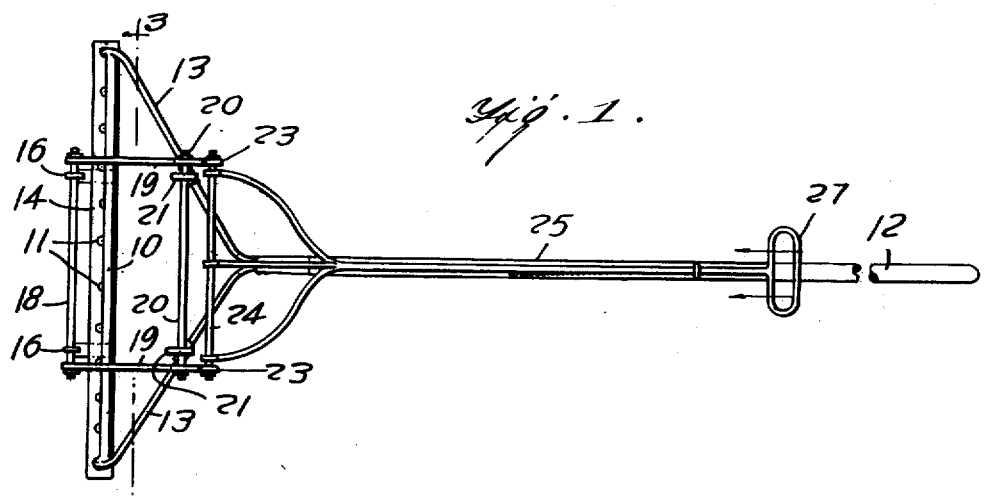
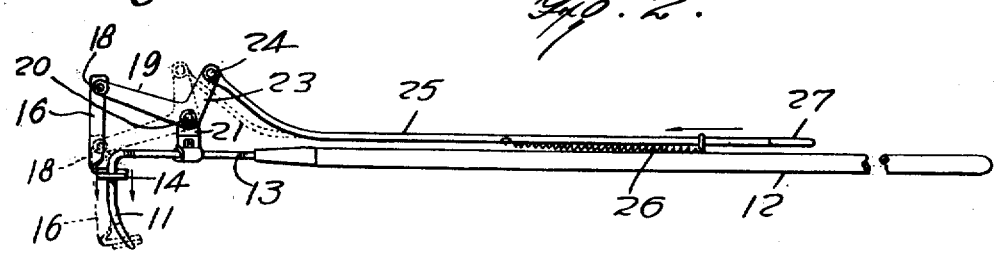
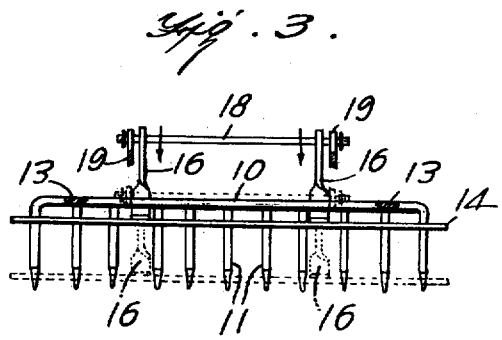
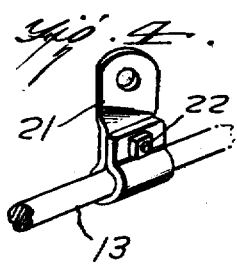
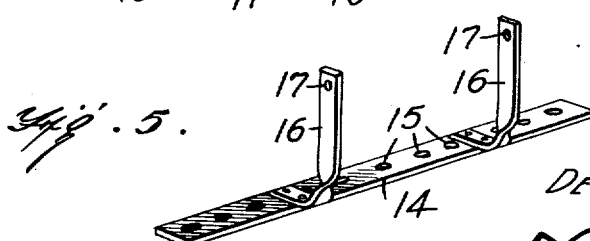
Inventor
DEWEY N. HUMPHREY,
By Franklin H. Hough
Attorney Patented Jan. 16, 1923.

1,442,615

UNITED STATES PATENT OFFICE.

DEWEY N. HUMPHREY, OF BLUECREEK, WASHINGTON.

RAKE CLEANER.

Application filed March 7, 1922. Serial No. 541,814.

*To all whom it may concern:*

Be it known that I, DEWEY N. HUMPHREY, a citizen of the United States, residing at Bluecreek, in the county of Stevens and State of Washington, have invented certain new and useful Improvements in Rake Cleaners, of which the following is a specification, reference being had therein to the accompanying drawings.

This invention relates to rake cleaners and has for an object to provide improved means to be applied to a hand rake for cleaning the teeth of accumulations thereon.

With this and other objects in view the invention comprises certain novel parts, units, elements, mechanical movements, combinations and arrangements of parts as disclosed in the drawing, together with equivalents thereof, as will be hereinafter more fully described and claimed.

In the drawings:

Figure 1 is a top plan view of a conventional rake with the device applied thereto;

Figure 2 is a view of a rake in side elevation showing the device thereon in raking and cleaning position;

Figure 3 is a sectional view of the device taken on line 3—3 of Figure 1;

Figure 4 is a perspective fragmentary view of the means for attaching the device to the rake, and Figure 5 is a perspective view of the cleaner element removed.

Like characters of reference indicate corresponding parts throughout the several views.

The improved cleaner which forms the subject matter of this application is adapted to be attached to a hand rake of the usual and ordinary type embodying a bar 10 carrying teeth 11 and to which a handle 12 is attached by means of the braces 13.

The device comprises an elongated plate 14 having perforations 15 spaced to receive the teeth 11, as indicated more particularly at Figures 1, 2 and 3, and extending throughout the length of the rake adapted to normally assume a position juxtaposed to the bar 10, leaving the ends of the teeth 11 extending therebelow to substantially their entire lengths for raking purposes in the usual and ordinary manner.

The strip 14 is provided with ears 16 upstanding therefrom having perforations 17 in their upper ends positioned to accommodate a rod 18. Brackets 21 are carried by the brace rods 13. A rod 20 is carried by the brackets, which rod carries at each end bell cranks 19, the cranks having a long arm and a short arm, and are adapted to be rocked on the rod, being pivotally mounted thereon. The cleaning plate 14 is carried by the long arms of the cranks by the straps 16.

The other arms 23 of the bell crank levers accommodate a rod 24 which passes through the bifurcated end of a rod 25 slidable along the handle 12. Preferably a spring 26 will be employed as shown more particularly at Figure 2 to hold the plate 14 normally juxtaposed to the bar 10 with a hand-hold 27 for manipulating the device.

Such manipulation includes exerting stress upon the hand-hold 27 to move the same in the direction indicated by the arrows at Figures 1 and 2, whereupon the bell crank levers 19 are tilted from their full line positions, as shown at Figure 2 to the dotted line position, sliding the plate 14 downwardly along the teeth 11, cleaning such teeth of any matter clinging thereto or any matter retained therebetween. The stress exerted is obviously against the tension of the spring 26 and, therefore, upon release the parts will be returned to their full line position, as shown at Figure 2.

What I claim is:

In combination with a rake having brace rods, a cleaning attachment comprising a pair of brackets carried by the brace rods, a rod carried by said brackets, a bell crank having a long and short arm respectively, pivotally mounted upon each end of said rod, and adapted to be rocked thereon, a second rod interconnecting the short arms of said cranks, a cleaning plate carried by the long arms of the cranks whereby when the cranks are rocked the plate moves in substantial parallelism with the rake teeth, and means for moving the second rod to rock said cranks.

In testimony whereof I hereunto affix my signature in presence of two witnesses.

DEWEY N. HUMPHREY.

Witnesses:
J. H. PLATT,
E. R. RADABUNGH.